(12) United States Patent
Wang et al.

(10) Patent No.: US 12,545,345 B2
(45) Date of Patent: Feb. 10, 2026

(54) BICYCLE RACK

(71) Applicant: NINGBO TUOTUO RIVER DESIGN COMPANY, Zhejiang (CN)

(72) Inventors: Zhi Min Wang, Ningbo (CN); Jun Tang, Ningbo (CN)

(73) Assignee: NINGBO TUOTUO RIVER DESIGN COMPANY, Zhejiang (CN)

( * ) Notice: Subject to any disclaimer, the term of this patent is extended or adjusted under 35 U.S.C. 154(b) by 0 days.

(21) Appl. No.: 18/955,313

(22) Filed: Nov. 21, 2024

(65) Prior Publication Data

US 2025/0256795 A1 Aug. 14, 2025

(30) Foreign Application Priority Data

Feb. 8, 2024 (CN) .......................... 202410178342.6

(51) Int. Cl.
*B62H 3/08* (2006.01)
*B62H 3/12* (2006.01)

(52) U.S. Cl.
CPC ................. *B62H 3/08* (2013.01); *B62H 3/12* (2013.01)

(58) Field of Classification Search
CPC ... B62H 3/08; B62H 3/12; B62H 5/14; B62H 3/00; B62H 5/00; E04H 6/005; E05B 71/00; B60R 9/10
See application file for complete search history.

(56) References Cited

U.S. PATENT DOCUMENTS

| | | | |
|---|---|---|---|
| 10,611,421 B2 * | 4/2020 | Rauba | B62H 3/12 |
| 2019/0329832 A1 * | 10/2019 | Rauba | E04H 6/005 |
| 2025/0115318 A1 * | 4/2025 | Teague | B62H 3/08 |
| 2025/0135930 A1 * | 5/2025 | Okafor | B62H 3/08 |
| 2025/0136211 A1 * | 5/2025 | Khoury | B62H 3/12 |

FOREIGN PATENT DOCUMENTS

| | | | | |
|---|---|---|---|---|
| CN | 108482529 A | * | 9/2018 | ............... B62H 3/12 |
| CN | 108657322 A | * | 10/2018 | ............... B62H 3/04 |
| CN | 112092950 A | * | 12/2020 | ............... B62H 3/12 |
| CN | 213262713 U | * | 5/2021 | |
| DE | 4119403 C2 | * | 6/1993 | ............... B62H 3/12 |
| DE | 202021106764 U1 | * | 3/2022 | ............... B62H 3/12 |
| JP | H06219355 A | * | 8/1994 | |
| LT | 6542 B | * | 7/2018 | ............. E04H 6/005 |

* cited by examiner

*Primary Examiner* — Ko H Chan
(74) *Attorney, Agent, or Firm* — Knobbe Martens Olson & Bear LLP

(57) ABSTRACT

This application relates to a bicycle rack. The bicycle rack includes a column, a wheel fixing mechanism including a first locking member, a second locking member, and a locking assembly. The wheel fixing mechanism also includes a base and a wheel holder mounted on the base. The locking assembly has a first locking position that engages with the first locking member, and a second locking position that engages with the second locking member. When the locking assembly is in the first locking position, the first locking member contacts the wheel holder, causing the wheel holder to be in a clamping state. When the locking assembly is in the second locking position, the first locking member is separated from the locking assembly, placing the wheel holder in a released state, while the locking assembly engages with the second locking member.

16 Claims, 9 Drawing Sheets

BICYCLE RACK

PRIORITY APPLICATION

This application claims the benefit of priority to CN application Ser. No. 202410178342.6, filed Feb. 8, 2024, which is incorporated herein by reference in its entirety.

TECHNICAL FIELD

The disclosure relates to the technical field of bicycles, and particularly relates to bicycle racks.

BACKGROUND

At present, with the strong promotion of environmentally friendly and low-carbon travel, along with the heavy traffic of both people and vehicles on the roads, bicycles have become a very convenient mode of transport for short distances due to their lightweight and compact design. Furthermore, in many countries worldwide, more and more people are embracing cycling as a popular sport. Typically, bicycles are stored in garages or indoors, and to save space, wall-mounted storage is often preferred. However, most wall-mounted bicycle racks currently available on the market are not user-friendly for less strong users. Users are required to exert significant effort to lift the entire bicycle and hang it on the wall, or to lift the front wheel and secure it to the wall, making the process difficult and inconvenient.

SUMMARY

Embodiments of the disclosure provide bicycle racks that address issues of difficult placement and inconvenient operation found in existing wall-mounted bicycle racks.

Some embodiments of the disclosure provide a bicycle rack. The bike rack can includes a column; a wheel fixing mechanism that includes a base, a wheel holder mounted on the base, and a first locking member, wherein the base is movably arranged along a linear or vertical direction on the column, and the wheel holder has a clamping state for securing the wheel and a released state for loosening the wheel; a second locking member, installed at the bottom of the column and positioned along the movement path of the base; and a locking assembly, mounted on the base, wherein the locking assembly has a first locking position that engages with the first locking member and a second locking position that engages with the second locking member. In some embodiments, when the locking assembly is in the first locking position, the first locking member contacts the wheel holder, causing the wheel holder to be in the clamping state, and when the locking assembly is in the second locking position, the first locking member is separated from the locking assembly, placing the wheel holder in the released state, while the locking assembly engages with the second locking member.

Further, in some embodiments, the locking assembly includes a locking element that is rotatably mounted on the base, allowing the locking assembly to switch between the first locking position and the second locking position.

Further, in some embodiments, the locking element is provided with a first hook on the side facing the first locking member, and a second hook on the opposite side. When the locking assembly is in the first locking position, the first hook engages with the first locking member, while the second hook is disengaged from the second locking member. When the locking assembly is in the second locking position, the second hook engages with the second locking member, while the first hook is disengaged from the first locking member.

Further, in some embodiments, the first locking member is equipped with a cylindrical first locking pin, and the first hook is designed to engage with the first locking pin. The second locking member is equipped with a cylindrical second locking pin, and the second hook is designed to engage with the second locking pin.

Further, in some embodiments, the first hook includes a first slope and a first hook portion. The first slope engages with the end of the first locking member that is near the second locking member, providing a force that causes the locking element to rotate toward the side of the first locking member. The first hook portion abuts the end of the first locking member near the second locking member, thereby maintaining the locking assembly in the first locking position; and/or the second hook includes a second slope and a second hook portion. The second slope engages with the second locking member, providing a force that causes the locking element to rotate toward the side of the second locking member. The second hook portion abuts the end of the second locking member, thereby maintaining the locking assembly in the second locking position.

Further, in some embodiments, the locking element comprises a first locking plate segment and a second locking plate segment, which are configured as separate components. The first lock plate includes a third hook portion, while the second lock plate includes a fourth hook portion. When the third hook portion engages with the end of the first locking member that is near the second locking member, the fourth hook portion is disengaged from the second locking member. Conversely, when the third hook portion is disengaged from the end of the first locking member that is near the second locking member, the fourth hook portion engages with the second locking member.

Further, in some embodiments, the first locking plate segment also includes a first stop portion, with the third hook portion and the first stop portion positioned at opposite ends of the first locking plate segment. The second locking plate segment includes a second stop portion, with the fourth hook portion and the second stop portion positioned at opposite ends of the second locking plate segment. When the first stop portion contacts the second locking member, the locking assembly switches from the second locking position to the first locking position. Conversely, when the second stop portion contacts the end of the first locking member that is near the second locking member, the locking assembly switches from the first locking position to the second locking position.

Further, in some embodiments, the wheel placement assembly also includes a wheel pressing plate, which is rotatably mounted on the base. The wheel pressing plate is located on the side of the first locking member that faces away from the base. The wheel pressing plate is constructed to apply pressure to the first locking member toward the base under external force, thereby ensuring that the locking assembly remains in the first locking position. One end of the wheel pressing plate, which is distant from the locking assembly, is equipped with a stop block. The stop block has a stop position that engages with the column and a disengaged position that separates from the column.

Further, in some embodiments, the wheel holder includes a first clamping jaw and a second clamping jaw that are oppositely arranged on the base. Both the first clamping jaw and the second clamping jaw are capable of rotating toward or away from each other. Each end of the first clamping jaw and the second grasping claw that faces the base is equipped with a protrusion. When the locking assembly is in the first locking position, the first locking member abuts against the protrusion, thereby maintaining the wheel holder in a clamping state.

Further, in some embodiments, the wheel holder also includes two mounting bases and two first elastic members. Both mounting bases are installed on the base, with the first clamping jaw rotatably mounted on one of the mounting bases and the second clamping jaw rotatably mounted on the other mounting base. The two first elastic members are correspondingly arranged with the two mounting bases, and two first elastic members correspond to the two mounting bases one-to-one, and each first elastic member enables the associated clamping jaw to have a tendency to move in a direction away from the other clamping jaw.

Further, in some embodiments, the base is provided with a channel at the end facing the second locking member, and the locking assembly is located at one end of the channel, while the other end of the channel has an opening that faces the second locking member. The second locking member enters the channel through this opening.

Further, in some embodiments, the bicycle rack further includes a second elastic member, and one end of the second elastic member is connected to the top of the column, while the other end is connected to the base.

In the prior art, the assembly includes a column, a wheel fixing mechanism, a second locking member, and a locking assembly. The column is fixedly installed on the wall. When it is necessary to place the bicycle on the bicycle rack, the front or rear wheel of the bicycle is pushed into the wheel fixing mechanism. The locking assembly transitions from the second locking position to the first locking position, and the wheel holder switches from a disengaged state to a clamping state, thereby securing the front or rear wheel of the bicycle. The base then moves in the direction away from the second locking member, causing the bicycle to move with the base in the same direction. This allows the bicycle to be easily secured vertically against the wall. When removing the bicycle, the user pulls down on the bicycle and presses down on the bicycle wheel that is held by the wheel holder, causing the base to move toward the second locking member. At the same time, the locking assembly transitions from the first locking position to the second locking position, preventing further movement of the base. The wheel holder switches from a clamping state to a disengaged state, allowing the bicycle to be easily removed.

BRIEF DESCRIPTION OF THE DRAWINGS

Drawings of the description as a constituent part of the disclosure are used to provide further understanding of the disclosure. The illustrative examples of the disclosure and the descriptions thereof are used to explain the disclosure, and are not intended to be unduly limiting. In the drawings.

Figure 1:
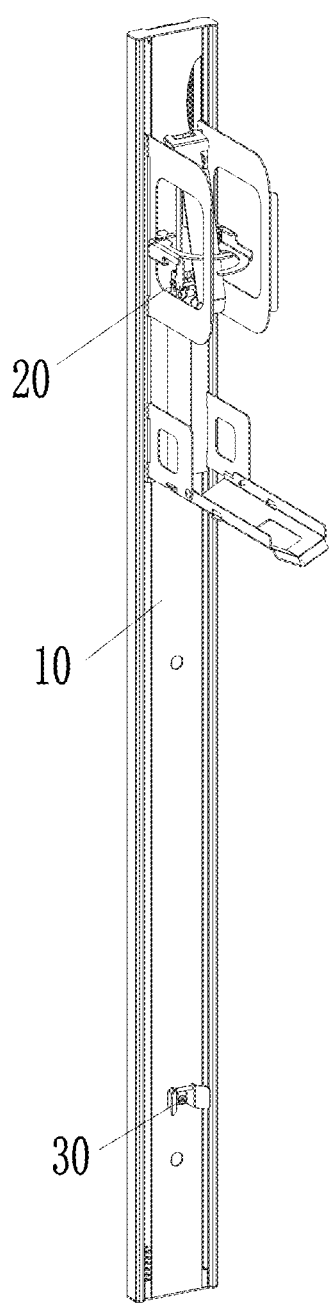
FIG. 1 is a schematic structural diagram of an embodiment of a bicycle rack according to the disclosure.
Figure 2:
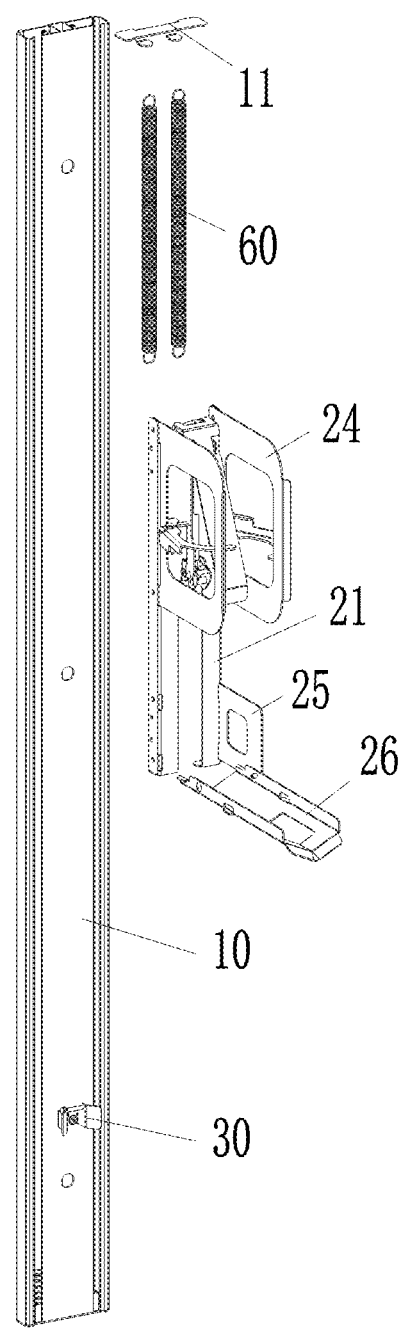
FIG. 2 is a schematic structural diagram of an exploded view of an embodiment of a bicycle rack according to the disclosure.
Figure 3:
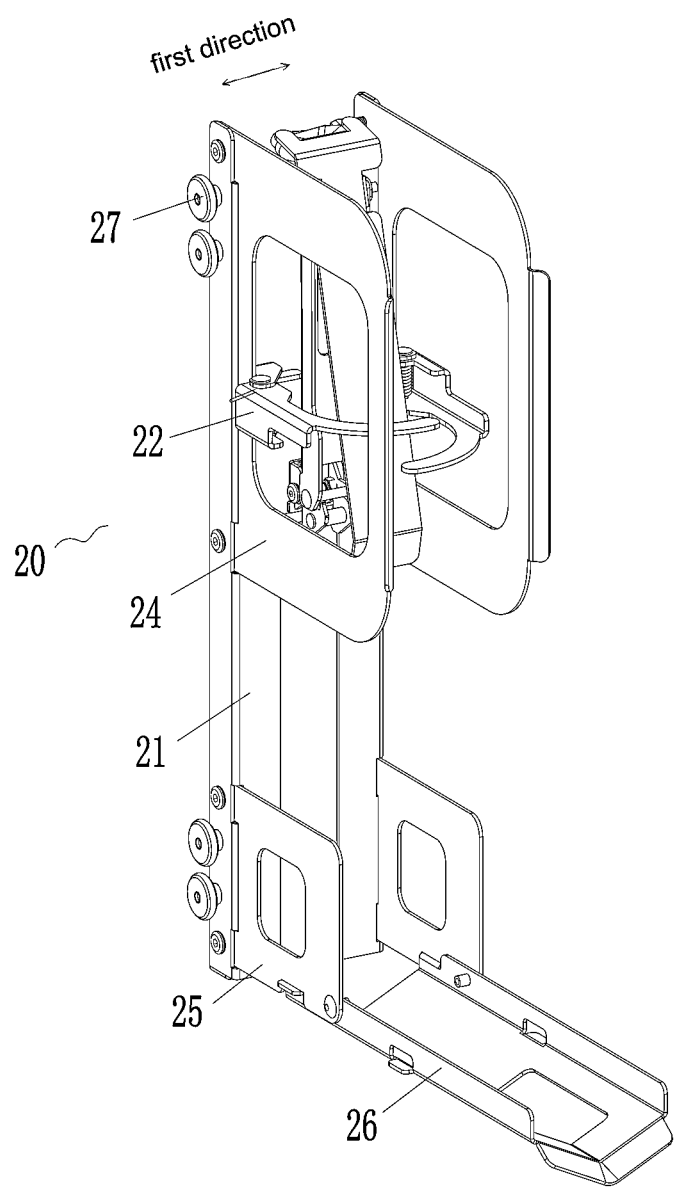
FIG. 3 is a schematic structural diagram of a wheel fixing mechanism of an embodiment of a bicycle rack according to the disclosure.

The above figures include the following reference numerals: column 10; upper fixing plate 11; wheel fixing mechanism 20; base 21; channel 211; wheel holder 22; first clamping jaw 221; second clamping jaw 222; protrusion 223; mounting base 224; first elastic member 225; first locking member 23; lock rod 231; first lock pin 232; guide plate 24; connecting plate 25; support plate 26; roller 27; lower fixing plate 28; wheel pressing plate base 29; second locking member 30; second lock base 31; second lock pin 32; locking assembly 40; first locking base 41; locking element 42; first hook 43; first slope 431; first hook portion 432; second hook 44; second slope 441; second hook portion 442; first locking plate segment 45; third hook portion 451; first stop portion 452; second locking plate segment 46; fourth hook portion 461; second stop portion 462; first pivot 47; second pivot 48; wheel pressing plate 50; stop block 51; second elastic member 60; first torsion spring 70; second torsion spring 80.

DETAILED DESCRIPTION

It should be noted that examples in the disclosure and features in the examples can be combined with one another as will be apparent to those of ordinary skill in the art upon consideration of this disclosure. The disclosure will be described in detail below with reference to the accompanying drawings and the examples, which are intended to illustrate without limiting the principles of the disclosure.

As shown in FIGS. 1-11, some embodiments of the disclosure provide a bicycle rack. The bicycle rack includes a column 10. The bicycle rack also includes a wheel fixing mechanism 20, which includes a base 21, a wheel holder 22 mounted on the base 21, and a first locking member 23. The base 21 is movably arranged on the column 10 so as to be movable in a linear or vertical direction. The wheel holder 22 is configured such that it is transitionable between a clamping state (e.g., an engaged, locked, or closed state) for securing the wheel of a bicycle, and a released state (e.g., a disengaged, unlocked, or open state) for releasing the wheel. The bicycle rack also includes a second locking member 30 installed at or toward the bottom of the column 10 and positioned along the movement path of the base 21. The bicycle rack also includes a locking assembly 40 mounted on the base 21. The locking assembly 40 is configured to transition between a first locking position that engages with the first locking member 23 (when the base is moved vertically upward) and a second locking position that engages with the second locking member 30 (when the base is moved vertically downward). When the locking assembly 40 is in the first locking position, the first locking member 23 contacts the wheel holder 22, causing the wheel holder 22 to transition into and be retained or secured in the clamping state. When the locking assembly 40 is in the second locking position, the first locking member 23 is separated from the locking assembly 40, causing the wheel holder 22 to transition to the released state, while the locking assembly 40 engages with the second locking member 30.

In the illustrated embodiment, the column 10 is shown in an installed configuration, for example, where the column 10 is fixedly installed on the wall such that the column 10 extends linearly in a generally vertical direction. In the initial state (e.g., before a bicycle is secured to the bike rack), the locking assembly 40 is in the second locking position. In this initial state, the wheel fixing mechanism 20 is located at the bottom of the column 10, and the wheel holder 22 is in the released state (e.g., ready to receive a wheel of the bicycle). When it is desired to place the bicycle in the bicycle rack, the front or rear wheel of the bicycle is pushed into the wheel fixing mechanism 20. Through interaction with the wheel, the locking assembly 40 is caused to transition from the second locking position to the first locking position, and the wheel holder 22 is caused to transition from the released or disengaged state to the clamping state, thereby securing the front or rear wheel of the bicycle within the wheel holder 22. The locking assembly 40 then disengages from the second locking member 30, and the base 21 moves in a direction away from the second locking member 30 (e.g., linearly upward along the column). The bicycle moves along with the base 21 in the same direction, thus easily securing the bicycle vertically onto the wall. When removing the bicycle from the bike rack, the user pulls down the bicycle while pressing down on the bicycle wheel that is clamped by the wheel holder 22, causing the base 21 to move towards the second locking member 30 (e.g., linearly downward along the column). When the base 21 moves downward, the locking assembly 40 is caused to transition from the first locking position to the second locking position, preventing further movement of the base 21. The wheel holder 22 is also caused to transition from the clamping state to the released state, allowing the bicycle to be removed.

As shown in FIGS. 1-11, in some embodiments of the disclosure, the locking assembly 40 includes a locking element 42 that is rotatably installed on the base 21, allowing the locking assembly 40 to switch between the first locking position and the second locking position (see, e.g., FIGS. 5-8). With this arrangement (e.g., rotatable installation on the base 21), the locking assembly 40 can effectively switch between the first locking position and the second locking position (e.g., rotation in one direction and rotation in the other direction).

Figure 4:
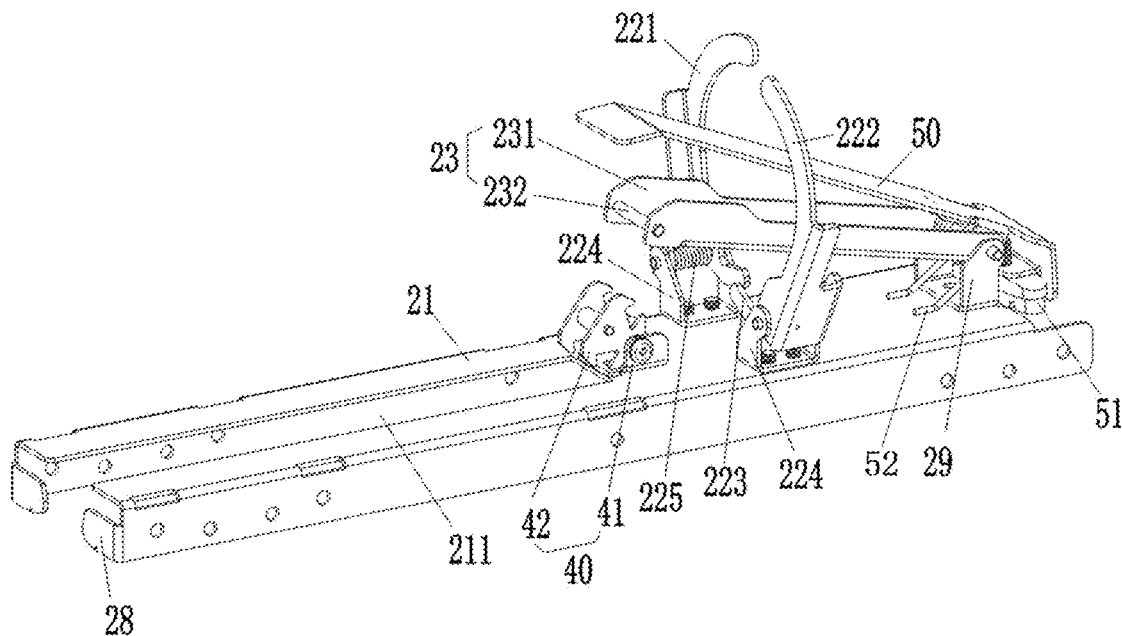
FIG. 4 is a schematic partial structural diagram of a wheel fixing mechanism of an embodiment of a bicycle rack according to the disclosure.
Figure 5:
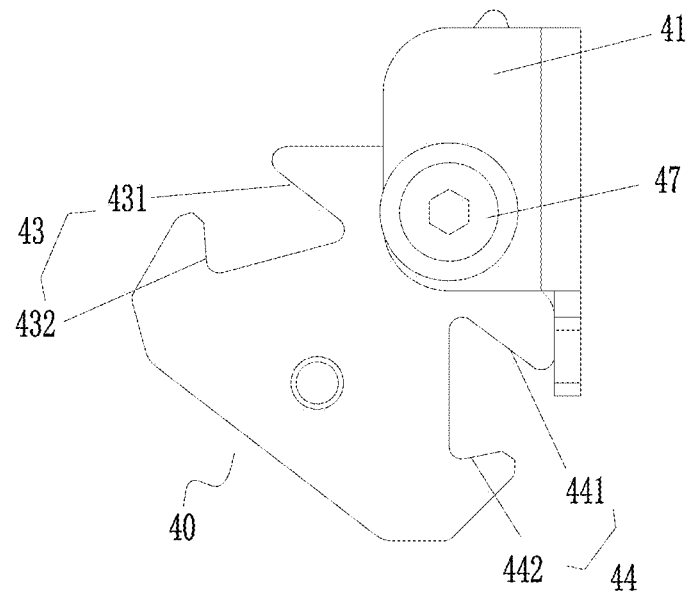
FIG. 5 is a schematic structural diagram of a locking assembly of an embodiment of a bicycle rack according to the disclosure.
Figure 6:
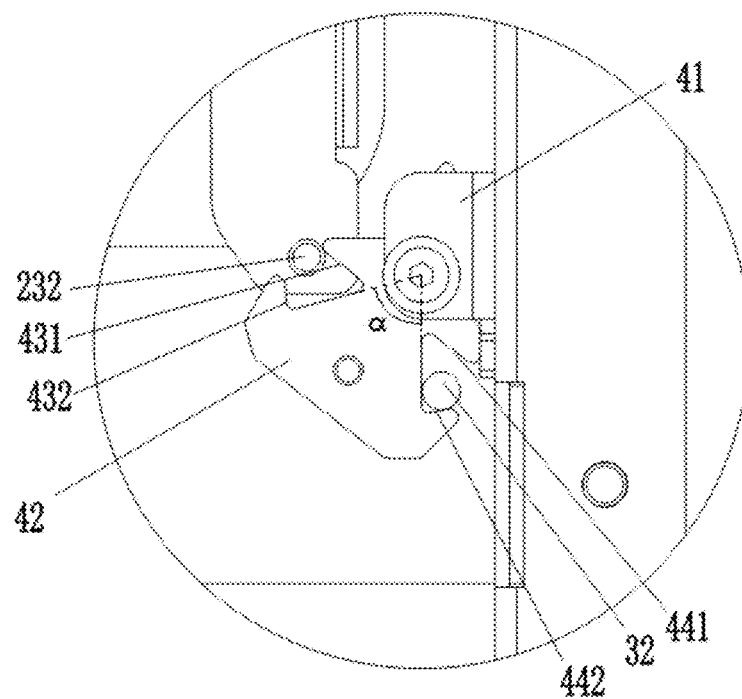
FIG. 6 is a schematic structural diagram of a locking assembly shown in an engaged configuration with a second locking pin.

As shown in FIGS. 1-8, in some embodiments of the disclosure, the locking element 42 is provided with a first hook 43 on the side facing the first locking member 23, and a second hook 44 on the opposite side (see, e.g., FIGS. 5 and 6). When the locking assembly 40 is in the first locking position, the first hook 43 engages with the first locking member 23, while the second hook 44 is disengaged from the second locking member 30. When the locking assembly 40 is in the second locking position, the second hook 44 engages with the second locking member 30, and the first hook 43 is disengaged from the first locking member 23.

In the illustrated embodiment, the first hook 43 and the second hook 44 are set at an angle α, as shown, for example, in FIG. 6. The locking element 42 is rotatable toward the side of the first locking member 23, allowing the first hook 43 to engage with the first locking member 23, thereby retaining the locking assembly 40 in the first locking position. The locking element 42 is also rotatable toward the side of the second locking member 30, allowing the second hook 44 to engage with the second locking member 30, thus retaining the locking assembly 40 in the second locking position.

As shown in FIGS. 1-8, in some embodiments of the disclosure, the first locking member 23 is equipped with a cylindrical first lock pin 232 (see, e.g., FIG. 4), and the first hook 43 is designed to engage with the first lock pin 232 (see, e.g., FIGS. 5-8), and the second locking member 30 is equipped with a cylindrical second lock pin 32, and the second hook 44 is designed to engage with the second lock pin 32.

Figure 7:
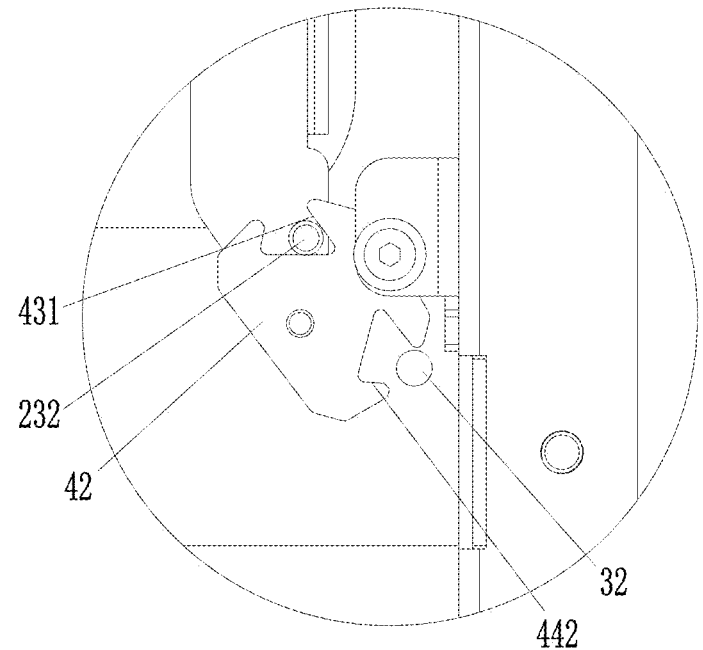
FIG. 7 is a schematic structural diagram of a locking assembly shown in a disengaged configuration with a second locking pin.
Figure 8:
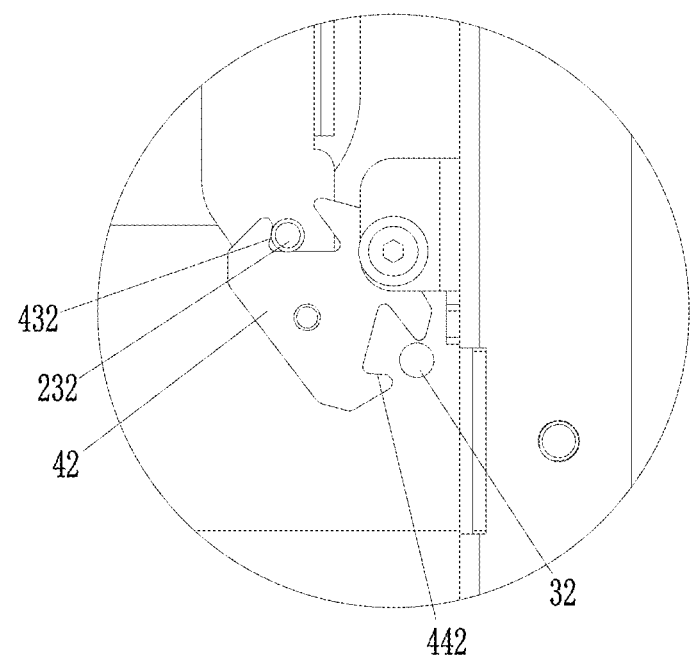
FIG. 8 is a schematic structural diagram of a locking assembly shown in an engaged configuration with a first locking pin.

In the illustrated embodiment, the first hook 43 is configured to form a hooking engagement with the cylindrical first lock pin 232, enabling the locking assembly 40 to securely lock with the first locking member 23, thereby allowing the locking assembly 40 to stably remain in the first locking position (see FIGS. 7-8). The second hook 44 is configured to form a hooking engagement with the cylindrical second lock pin 32, enabling the locking assembly 40 to securely lock with the second locking member 30, allowing the locking assembly 40 to stably remain in the second locking position (see FIG. 6). Through the above arrangement, the overall structural stability can be enhanced.

Figure 11:
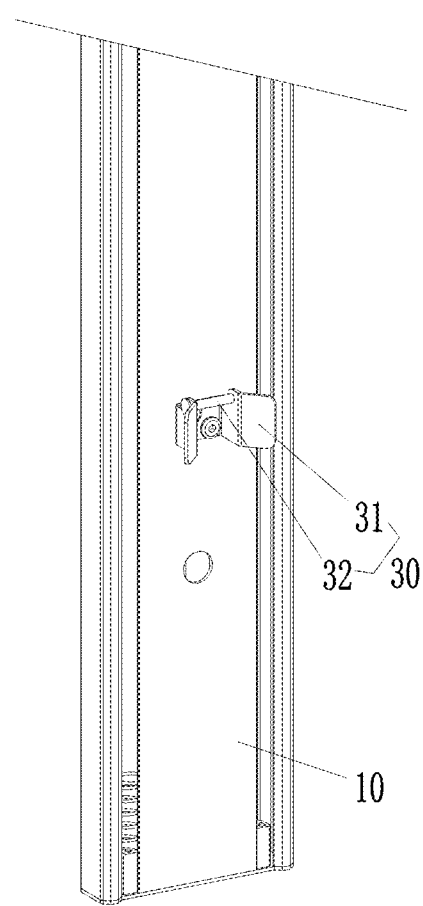
FIG. 11 is a schematic partial structural diagram of an embodiment of a bicycle rack according to the disclosure.

As shown in FIG. 11, the second locking member 30 also includes a second lock base 31. Two ends of the second lock base 31 extend away from each other (e.g., outwardly away from the column 10), which can be used to support the bicycle wheel. For example, the bicycle wheel can be initially received between the two ends of the second lock base 31.

As shown in FIGS. 1-8, in one embodiment of the disclosure, the first hook 43 includes a first slope (or angled portion) 431 (see FIG. 7) and a first hook portion 432 (see FIG. 8). The first slope 431 can be positioned and configured to engage with the end of the first locking member 23 near the second locking member 30, providing a force that rotates the locking element 42 toward the side where the first locking member 23 is located. For example, contact between the first slope 431 and the end of the first locking member 23 can cause the locking assembly 40 to rotate to the first locking position. The first hook portion 432 can be configured to contact the end of the first locking member 23 near the second locking member 30, keeping the locking assembly 40 in the first locking position. Additionally, or alternatively, the second hook 44 includes a second slope 441 and a second hook portion 442. The second slope 441 can be configured to engage with the second locking member 30, providing a force that rotates the locking element 42 toward the side where the second locking member 30 is located. The second hook portion 442 contacts the end of the second locking member 30, keeping the locking assembly 40 in the second locking position.

In the illustrated embodiment, the first slope 431 engages with the end of the first locking member 23 near the second locking member 30, providing a force that rotates the locking element 42 toward the side where the first locking member 23 is located. After the locking element 42 rotates to a certain angle, the first hook portion 432 contacts the end of the first locking member 23 near the second locking member 30, allowing the locking assembly 40 to remain in the first locking position. As described above, the rotation of the locking element 42 and its locking with the first locking member 23 are both achieved through the structure of the first hook 43 itself, without the need for additional driving mechanisms. This simplifies the overall structure of the bicycle rack. Similarly, the rotation of the locking element 42 and its locking with the second locking member 30 are achieved through the structure of the second hook 44, without the need for additional driving mechanisms. This further simplifies the overall structure of the bicycle rack.

As shown in FIGS. 1 to 8, in the illustrated embodiment, the first locking member 23 can further include a first locking base 41 and a first pivot 47 (see, e.g., FIG. 5). The first locking base 41 is mounted on the base 21, and the first pivot 47 is installed on the first locking base 41 (see, e.g., FIG. 4). The locking element 42 is mounted on the first locking base 41 through the first pivot 47, allowing it to rotate relative to the first locking base 41 toward the side of the first locking member 23 or the side of the second locking member 30. The bottom surfaces of the first hook portion 432 and the second hook portion 442 are extended until they intersect, forming an angle α (see FIG. 6). The range of angle α can be between 60° and 85°. The above arrangement ensures that when the first hook portion 432 is engaged with the first locking member 23, the second hook portion 442 is disengaged from the second locking member 30. When the second hook portion 442 is engaged with the second locking member 30, the first hook portion 432 is disengaged from the first locking member 23. This arrangement can facilitate the smooth transition of the locking assembly 40 between the first locking position and the second locking position.

Figure 9:
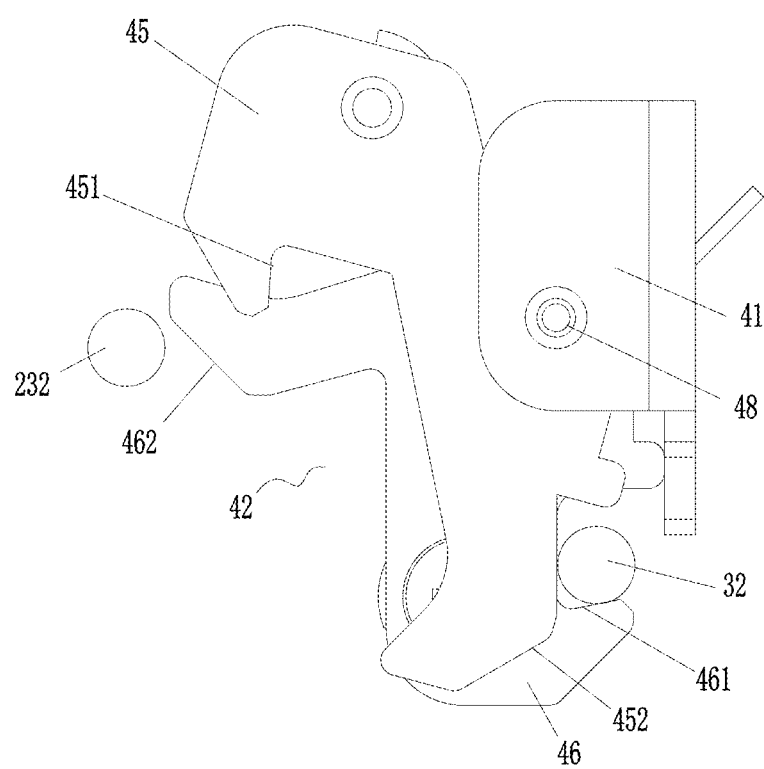
FIG. 9 is a schematic structural diagram of a locking assembly of another embodiment of a bicycle rack according to the disclosure.
Figure 10:
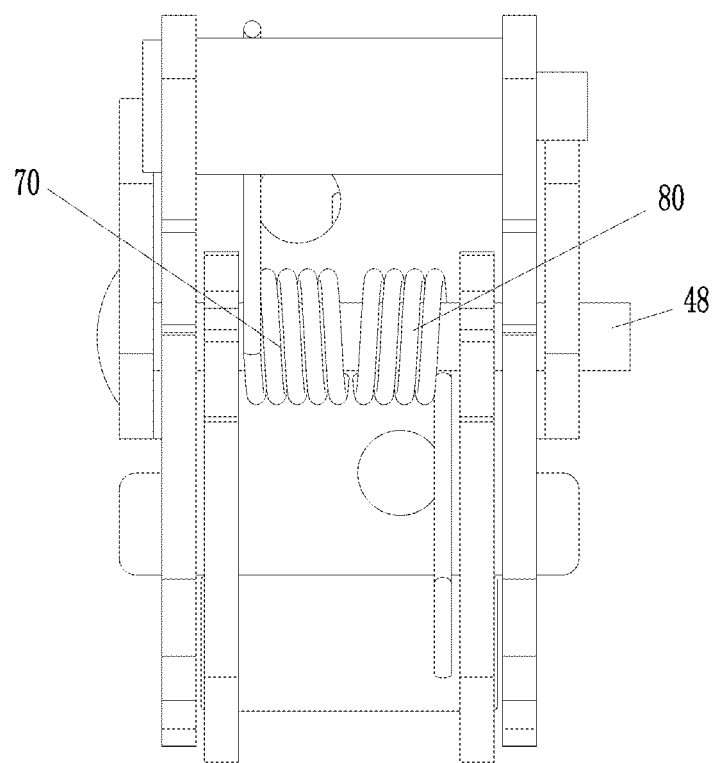
FIG. 10 is a schematic structural diagram of a locking assembly of another embodiment of a bicycle rack according to the disclosure from another perspective.

FIGS. 9-11 illustrate an alternative version of the locking element 42 that can be used, for example, with the bike rack illustrated in FIGS. 1-4. In the illustrated embodiment of FIGS. 9-11, the locking element 42 includes a split first locking plate segment 45 and a second locking plate segment 46. The first locking plate segment 45 includes a third hook portion 451, and the second locking plate segment 46 includes a fourth hook portion 461. When the third hook portion 451 engages with the end of the first locking member 23 that is near the second locking member 30, the fourth hook portion 461 disengages from the second locking member 30. When the third hook portion 451 is disengaged from the end of the first locking member 23 near the second locking member 30, the fourth hook portion 461 engages with the second locking member 30.

In the illustrated embodiment of FIGS. 9-11, through the coordinated interaction between the first locking plate segment 45 and the second locking plate segment 46, the locking assembly 40 can switch between the first locking position and the second locking position. Additionally, since the first locking plate segment 45 and the second locking plate segment 46 are separately arranged, if one of them is damaged, it does not affect the operation of the other. Only the damaged locking plate segment needs to be replaced or repaired.

Referring to the illustrated embodiment of FIGS. 9-11, the first locking plate segment 45 also includes a first stop portion 452, with the third hook portion 451 and the first stop portion 452 positioned at opposite ends of the first locking plate segment 45. The second locking plate segment 46 includes a second stop portion 462, with the fourth hook portion 461 and the second stop portion 462 located at opposite ends of the second locking plate segment 46. When the first stop portion 452 abuts against the second locking member 30, the locking assembly 40 switches from the second locking position to the first locking position. When the second stop portion 462 abuts against the end of the first locking member 23 that is close to the second locking member 30, the locking assembly 40 switches from the first locking position to the second locking position.

In the illustrated embodiment of FIGS. 9-11, when the first stop portion 452 abuts against the second locking member 30, under the abutting engagement of the two, the first locking plate segment 45 rotates toward the side where the first locking member 23 is located. During this rotation, the third hook portion 451 engages with the end of the first locking member 23 that is close to the second locking member 30, thereby switching the locking assembly 40 from the second locking position to the first locking position. Similarly, when the second stop portion 462 abuts against the end of the first locking member 23 that is close to the second locking member 30, under the abutting engagement of the two, the second locking plate segment 46 rotates toward the side where the second locking member 30 is located. During this rotation, the fourth hook portion 461 engages with the second locking member 30, thereby switching the locking assembly 40 from the first locking position to the second locking position. The interaction between the first locking plate segment 45 and the second locking plate segment 46 prevents the third hook portion 451 from engaging with the end of the first locking member 23 that is close to the second locking member 30 while the fourth hook portion 461 engages with the second locking member 30, thereby improving the stability of the product.

Referring to FIGS. 1-11, in the illustrated embodiment, the wheel fixing mechanism 20 further includes a wheel pressing plate 50 (see, for example, FIG. 4). The wheel pressing plate 50 is rotatably or pivotally connected to the base 21 and the pivot point is for the wheel pressing plate 50 positioned on the base 21 on a side of the wheel pressing plate 50 that is opposite to the first locking member 23. The wheel pressing plate 50 is designed to apply external force to press the first locking member 23 toward the base 21, thereby ensuring that the locking assembly 40 remains in the first locking position. One end of the wheel pressing plate 50, which is far from the locking assembly 40, is equipped with a stop block 51. The stop block 51 has a stop position that engages with (e.g., contacts) the column 10 and a disengaged position that separates the stop block 51 from the column 10. In some embodiments, when the stop block 51 is engaged with the column 10 it helps to slow the movement of the base 21 along the column.

When it is necessary to place the bicycle on the bicycle rack, the front or rear wheel of the bicycle is pushed into the wheel fixing mechanism 20. At this point, the front or rear wheel contacts the wheel pressing plate 50, causing the wheel pressing plate 50 to rotate and press the first locking member 23 toward the base 21. This causes the first locking member 23 to engage or lock with the locking assembly 40 on the base 21, allowing the locking assembly 40 to transition from the second locking position to the first locking position. As a result, the wheel holder 22 transitions from a released state to a clamping state, securely holding the front or rear wheel of the bicycle that has been inserted into the wheel fixing mechanism 20. Subsequently, the base 21 moves in a direction away from the second locking member 30, causing the bicycle to move along with the base 21 (e.g., in an upward direction), easily securing the bicycle vertically against the wall.

In the illustrated embodiment, the wheel pressing plate 50 is equipped with a stop block 51 at an end thereof that is opposite the locking assembly 40. When the locking assembly 40 is in the second locking position, the stop block 51 is in the stop position, which limits the movement of the base 21, preventing it from moving away from the second locking member 30. Conversely, when the locking assembly 40 is in the first locking position, the stop block 51 is in the release position, allowing the base 21 to be free and enabling it to move the bicycle away from the second locking member 30 to secure the bicycle on the wall.

Referring to FIGS. 1-11, in some embodiments of the disclosure, the wheel fixing mechanism 20 also includes a torsion spring 52 and a wheel pressing plate base 29. The wheel pressing plate 50 and the torsion spring 52 are mounted on the wheel pressing plate base 29. The stop block 51 is located at an end of the wheel pressing plate 50 that is opposite the locking assembly 40. Under the action of the torsion spring 52, the end of the wheel pressing plate 50 is biased away from the locking assembly 40. When the bicycle wheel does not contact the wheel pressing plate 50, the bottom end of the wheel pressing plate rotates away from the base 21 and the top end of the wheel pressing plate 50 rotates towards the base 21 due to the torsion spring's force, causing the stop block 51 (positioned one the top end of the wheel pressing plate 50) to contact with the column 10. This results in the stop block 51 being in the stop position, locking the base 21 in its current position and preventing it from moving away from the second locking member 30, thus ensuring safety. When the bicycle wheel presses against the wheel pressing plate 50, the bottom end of the wheel pressing plate 50 rotates towards the base 21 and the top end of the wheel pressing plate 50 rotates away from the base 21, allowing the stop block 51 to disengage from the column 10, allowing the base 21 free to move up and down.

Referring to FIGS. 1-11, in the illustrated embodiment, the wheel holder 22 includes a first clamping jaw 221 and a second clamping jaw 222 arranged oppositely on the base 21 (see, e.g., FIG. 4). Both the first clamping jaw 221 and the second clamping jaw 222 are configured such that they can rotate or pivot towards or away from each other. Each end of the first clamping jaw 221 and the second clamping jaw 222 that faces the base 21 is equipped with a protrusion 223. When the locking assembly 40 is in the first locking position, the first locking member 23 contacts the protrusion 223, ensuring that the wheel holder 22 is in a clamping state.

In the illustrated embodiment, when the locking assembly 40 is in the first locking position, the first locking member 23 abuts against the protrusions 223 on the first clamping jaw 221 and the second clamping jaw 222. The first locking member 23 press the protrusions 223, causing the first clamping jaw 221 and the second clamping jaw 222 to rotate towards each other, thereby maintaining the wheel holder 22 in a clamping state and effectively clamping or the bicycle wheel between the first and second clamping jaws 221, 22.

Referring to FIGS. 1-11 (and in particular FIG. 4), in some embodiments, the wheel holder 22 further includes two mounting bases 224 and two first elastic members 225 (e.g., torsion springs). The two mounting bases 224 are mounted on the base 21, with the first clamping jaw 221 rotatably installed on one mounting base 224, and the second clamping jaw 222 rotatably installed on the other mounting base 224. The two first elastic members 225 correspond to the two mounting bases 224, and each first elastic member 225 enables the associated clamping jaw to have a tendency to move (e.g., be biased) in a direction away from the other clamping jaw.

Through the above arrangement, the first clamping jaw 221 has a tendency or bias to move away from the second clamping jaw 222, and the second clamping jaw 222 has a tendency or bias to move away from the first clamping jaw 221, thereby creating a gap between the free ends of first clamping jaw 221 and the second clamping jaw 222 for the bicycle wheel to pass through.

Referring to FIGS. 1-11, in the illustrated embodiment, the first locking member 23 also includes a lock arm 231, with the first lock pin 232 mounted on the lock arm 231. When the locking assembly 40 is in the first locking position, the lock arm 231 contacts the protrusion 223. Since the first elastic member 225 can push the associated clamping jaw to move away from the other clamping jaw, the protrusion 223 applies a compressive force to the lock arm 231, allowing the first lock pin 232 to press against the first hook portion 432, keeping the wheel holder 22 in a clamping state.

It is noted that the number of wheel holders 22 can be adjusted based on practical needs.

In some embodiments, the first elastic member 225 is a torsion spring.

Referring to FIGS. 1-11, in some embodiments, a channel 211 (see FIG. 4) is provided at the end of the base 21 facing the second locking member 30. The locking assembly 40 is located at one end of the channel 211, while the other end of the channel 211 has an opening facing the second locking member 30. The second locking member 30 can enter the channel 211 through this opening (e.g., as the base moves downwardly along the column).

In these embodiments, the second locking member 30 can enter the channel 211 through the opening and lock with the locking assembly 40 at one end of the channel 211.

Referring to FIGS. 1-11, in some embodiments, the bicycle rack also includes a second elastic member 60 (see FIG. 2), with one end of the second elastic member 60 connected to the top of the column 10 and the other end connected to the base 21.

In the illustrated embodiment, the second elastic member 60 is positioned between the column 10 and the base 21. When the locking assembly 40 is in the second locking position, the second elastic member 60 is stretched. Because the second locking member 30 is fixedly installed on the column 10, the base 21 is held in place by the locking assembly's 40 locking engagement with the second locking member 30, preventing it from being pulled away from the second locking member 30 by the second elastic member 60. Conversely, when the locking assembly 40 is in the first locking position, it disengages from the second locking member 30 and locks with the first locking member 23. At this point, the base 21 can move away from the second locking member 30 under the elastic restoring force of the second elastic member 60, allowing the base 21 to carry the bicycle away from the second locking member 30 and secure it on the wall.

In some embodiment of the disclosure, the second elastic member 60 is a tension spring.

Referring to FIGS. 1-11, in the illustrated, the top of the column 10 is fitted with an upper fixing plate 11 (see FIG. 2), and the bottom of the base 21 is fitted with a lower fixing plate 28 (see FIG. 4). One end of the second elastic member 60 is connected to the upper fixing plate 11, while the other end connects to the lower fixing plate 28.

Referring to FIGS. 1-11, in some embodiments, rollers 27 (see FIG. 3) are positioned on both sides of the base 21 along the first direction, allowing the base 21 to slide smoothly on the column 10.

Referring to FIGS. 1-11, in some embodiments, guide plates 24 (see FIG. 3) are also provided on both sides of the base 21 along the first direction, facilitating the entry of the wheel.

Referring to FIGS. 1-11, in some embodiments, connecting plates 25 are provided on both sides of the base 21 along the first direction, with two connecting plates 25 located at the bottom of the base 21. The wheel fixing mechanism 20 also includes a support plate 26, with one end hinged to the two connecting plates 25. The support plate 26 can include a V-shaped structure, ensuring that the bicycle wheel remains centered on the support plate 26 for improved stability.

Referring to FIGS. 1-4 and FIGS. 9-11, in the illustrated embodiment, the locking assembly 40 also includes a first torsion spring 70, a second torsion spring 80, a first lock base 41, and a second pivot 48 (see, e.g., FIG. 10). Both the first torsion spring 70 and the second torsion spring 80 are mounted on the second pivot 48. The first locking plate segment 45 tends to rotate counterclockwise under the action of the first torsion spring 70 (as shown in FIG. 9), while the second locking plate segment 46 tends to rotate counterclockwise under the action of the second torsion spring 80 (as shown in FIG. 9).

It can be seen from the above description that the embodiments of the disclosure achieve the following technical effects: in the prior art, the assembly includes a column, a wheel fixing mechanism, a second locking member, and a locking assembly. The column is fixedly installed on the wall. When it is necessary to place the bicycle on the bicycle rack, the front or rear wheel of the bicycle is pushed into the wheel fixing mechanism. The locking assembly transitions from the second locking position to the first locking position, and the wheel holder switches from a disengaged state to a clamping state, thereby securing the front or rear wheel of the bicycle. The base then moves in the direction away from the second locking member, causing the bicycle to move with the base in the same direction. This allows the bicycle to be easily secured vertically against the wall. When removing the bicycle, the user pulls down on the bicycle and presses down on the bicycle wheel that is held by the wheel holder, causing the base to move toward the second locking member. Synchronously, the locking assembly transitions from the first locking position to the second locking position, preventing further movement of the base. The wheel holder switches from a clamping state to a disengaged state, allowing the bicycle to be easily removed.

The embodiments described above are only part of the embodiments of the present disclosure and not all of them. Based on the embodiments of the present disclosure, all other embodiments obtained by those skilled in the art without creative efforts should fall within the scope of protection of the present disclosure.

It is important to note that the terminology used herein is to describe particular embodiments only and is not intended to limit the exemplary embodiments of the present application. As used herein, unless the context clearly indicates otherwise, the singular form is intended to include the plural form as well. Furthermore, it should be understood that when the terms "comprise" and/or "include" are used in this specification, they indicate the presence of features, steps, operations, devices, components, and/or combinations thereof.

What is described above are some embodiments of the disclosure and are not intended to limit the disclosure, and those skilled in the art can make various modifications and changes to the disclosure. Any modifications, equivalent substitutions, improvements, etc. within the spirit and principles of the disclosure are intended to fall within the protection scope of the disclosure.

What is claimed is:

1. A bicycle rack, comprising:
a column;
a wheel fixing mechanism comprising a base, a wheel holder mounted on the base, and a first locking member, wherein the base is movably arranged on the column for movement in a linear direction, and wherein the wheel holder is configured to provide a clamping state for securing a wheel of a bicycle and a released state for unclamping the wheel;
a second locking member positioned on the column at a position along a movement path of the base; and
a locking assembly mounted on the base and having a first locking position that engages with the first locking member and a second locking position that engages with the second locking member, wherein:
in the first locking position, the first locking member contacts the wheel holder, causing the wheel holder to be in the clamping state, and
in the second locking position, the first locking member is separated from the locking assembly, causing the wheel holder to be in the released state, while the locking assembly engages with the second locking member.

2. The bicycle rack as claimed in claim 1, wherein the locking assembly comprises a locking element that is rotatably arranged on the base, the locking element allowing the locking assembly to transition between the first locking position and the second locking position.

3. The bicycle rack as claimed in claim 2, wherein:
the locking element comprises a first hook on a side facing the first locking member and a second hook on an opposite side of the locking element,
in the first locking position, the first hook engages with the first locking member, while the second hook is disengaged from the second locking member, and
in the second locking position, the second hook engages with the second locking member, while the first hook is disengaged from the first locking member.

4. The bicycle rack as claimed in claim 3, wherein:
the first locking member comprises a cylindrical first lock pin, and the first hook is configured to engage with the first lock pin, and
the second locking member comprises a cylindrical second lock pin, and the second hook is configured to engage with the second lock pin.

5. The bicycle rack as claimed in claim 3, wherein at least one of:
the first hook includes a first slope and a first hook portion, the first slope configured to engage with an end of the first locking member that is adjacent to the second locking member to provide a force that causes the locking element to rotate toward a side of the first locking member, and the first hook portion abuts an end of the first locking member that is near the second locking member, thereby maintaining the locking assembly in the first locking position; or
the second hook includes a second slope and a second hook portion, and the second slope is configured to engage with the second locking member to provide a force that causes the locking element to rotate toward a side of the second locking member, and the second hook portion abuts an end of the second locking member, thereby maintaining the locking assembly in the second locking position.

6. The bicycle rack as claimed in claim 5, wherein:
the locking element comprises a first locking plate segment and a second locking plate segment, which are spaced apart,
the first locking plate segment comprises a third hook portion, the second locking plate segment comprises a fourth hook portion, when the third hook portion engages with an end of the first locking member that is near the second locking member, the fourth hook portion is disengaged from the second locking member, and when the third hook portion is disengaged from the end of the first locking member that is near the second locking member, the fourth hook portion engages with the second locking member.

7. The bicycle rack as claimed in claim 6, wherein:

the first locking plate segment further comprises a first stop portion, the third hook portion and the first stop portion are located at opposite ends of the first locking plate segment, and the second locking plate segment also comprises a second stop portion, with the fourth hook portion and the second stop portion located at opposite ends of the second locking plate segment, when the first stop portion abuts the second locking member, the locking assembly switches from the second locking position to the first locking position, and when the second stop portion abuts the end of the first locking member that is near the second locking member, the locking assembly switches from the first locking position to the second locking position.

8. The bicycle rack as claimed in claim 1, wherein the wheel fixing mechanism further comprises a wheel pressing plate rotatably mounted on the base, wherein the wheel pressing plate is positioned on a side of the first locking member that faces away from the base, and the wheel pressing plate is configured to apply external force to press the first locking member toward the base, thereby placing the locking assembly in the first locking position, and an end of the wheel pressing plate that is farther from the locking assembly is comprises a stop block, the stop block having:

a stop position where the stop block engages with the column, and a disengaged position, where the stop block is separated from the column.

9. The bicycle rack as claimed in claim 1, wherein the wheel holder comprises a first clamping jaw and a second clamping jaw, which are positioned oppositely on the base, wherein both the first clamping jaw and the second clamping jaw can rotate toward or away from each other, and each of the first clamping jaw and the second clamping jaw has a protrusion at an end facing the base, and when the locking assembly is in the first locking position, the first locking member abuts the protrusions, causing the wheel holder to be in the clamping state.

10. The bicycle rack as claimed in claim 9, wherein the wheel holder further comprises two mounting bases and two first elastic members, and both mounting bases are installed on the base, and the first clamping jaw is rotatably mounted on one of the mounting bases and the second clamping jaw is rotatably mounted on the other mounting base, and the two first elastic members correspond to the two mounting bases one-to-one, and each first elastic member enables the associated clamping jaw to have a tendency to move in a direction away from the other clamping jaw.

11. The bicycle rack as claimed in claim 1, wherein the base is provided with a channel at an end facing the second locking member, and the locking assembly is located at one end of the channel and the other end of the channel has an opening that faces the second locking member, and the second locking member enters the channel through this opening.

12. The bicycle rack as claimed in claim 1, wherein the bicycle rack further includes an elastic member connected on one end to a top of the column and on the other end is connected to the base, wherein the elastic member provides a force that pulls the base along the column in a direction towards the top of the column.

13. A bicycle rack, comprising:

a column;

a wheel fixing mechanism that comprises a base, a wheel holder mounted on the base, and a first locking member, wherein the base is movably arranged on the column in a linear or vertical direction, and the wheel holder is transitionable between a clamping state for securing the wheel and a released state for unclamping the wheel;

a second locking member positioned toward one end the column along a movement path of the base; and a locking assembly, wherein the locking assembly couples with the base, wherein:

when the base slides in proximity to the second locking member, the locking assembly engages with the second locking member, and the wheel holder is opened, and wherein, and when a wheel presses the first locking member, the locking assembly is disengaged from the second locking member and combined with first locking member, and the wheel holder is closed to hold the wheel.

14. The bicycle rack as claimed in claim 13, wherein the locking assembly rotationally couples with the base.

15. A bicycle rack, comprising:

a column;

a wheel fixing mechanism includes a base, a wheel holder mounted on the base, and a first locking member, wherein a first end of the first locking member is rotatably connected to a top of the base, and the base is movably arranged on the column, and the wheel holder is configured to transition between a closed state and an open state;

a locking assembly installed on the base;

a second locking member, which is installed near a lower end of the column and is located on a moving path of the base, wherein, when the base slides into proximity to the second locking member, the locking assembly can be combined with the second locking member to restrain the base to a lower position; and wherein when a wheel is pressed against the first locking member, the second end of the first locking member can be rotated to combine with the locking assembly, and the locking assembly is disengaged from the second locking member also causing the first locking member to act on the wheel holder to close the wheel holder to hold the wheel.

16. The bicycle rack as claimed in claim 15, further comprising an elastic member, wherein a first end of the elastic member is connected to the column, and second end of the elastic member is connected to the base, the elastic member providing a force that causes the base to slide along the column.

* * * * *